United States Patent [19]

Hunt

[11] Patent Number: 4,804,301

[45] Date of Patent: Feb. 14, 1989

[54] CENTRAL DRAWBAR COUPLING ACTUATING MECHANISM

[75] Inventor: Carl E. Hunt, Davisburg, Mich.

[73] Assignee: GTE Valenite Corporation, Troy, Mich.

[21] Appl. No.: 135,853

[22] Filed: Feb. 24, 1988

[51] Int. Cl.[4] .............................................. B23C 1/00
[52] U.S. Cl. ..................................... 409/233; 279/87; 279/89
[58] Field of Search ............... 409/233, 231, 232, 234; 279/87, 89; 82/36 B

[56] References Cited

U.S. PATENT DOCUMENTS

| | | |
|---|---|---|
| 4,175,898 | 11/1979 | Wood ................................... 409/233 |
| 4,303,360 | 12/1981 | Gayen et al. ........................ 409/233 |
| 4,663,818 | 5/1987 | Erickson ............................. 82/36 B |
| 4,735,532 | 4/1988 | Hunt ................................... 409/232 |

Primary Examiner—Leon Scott, Jr.
Attorney, Agent, or Firm—David J. Koris

[57] ABSTRACT

Central drawbar operated tooling connection system wherein a pair of wedges are positively driven laterally outward and retracted by reciprocation of a central drawbar. Mechanical advantage of a key slot between drawbar and wedges plus mechanical advantage of the wedge angle amplifies a drawbar force for producing axial loading in the order of 5:1. Alternative forms of drawbar actuation such as by screw thread feed, preloaded spring with hydraulic release are optional.

23 Claims, 4 Drawing Sheets

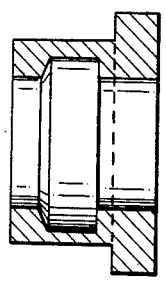
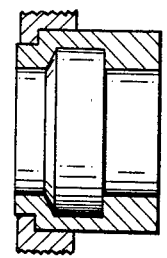
FIG. 3a   FIG. 3b
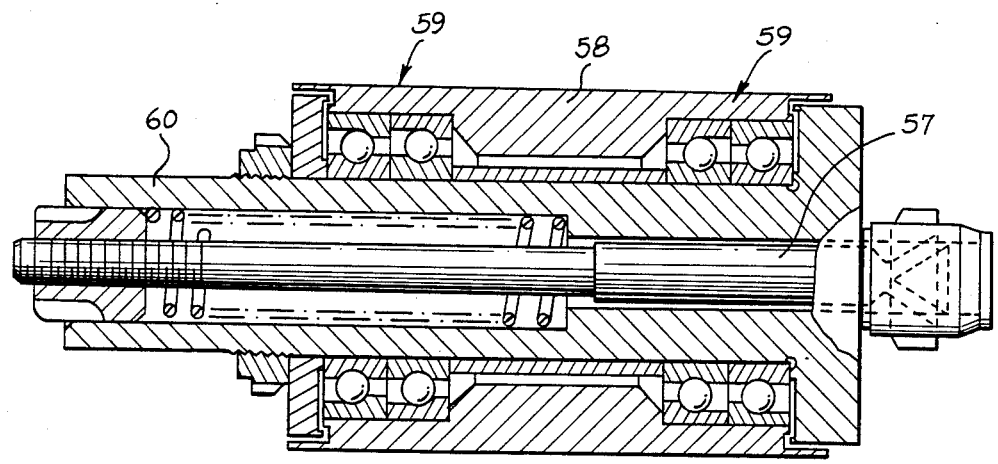
FIG. 5

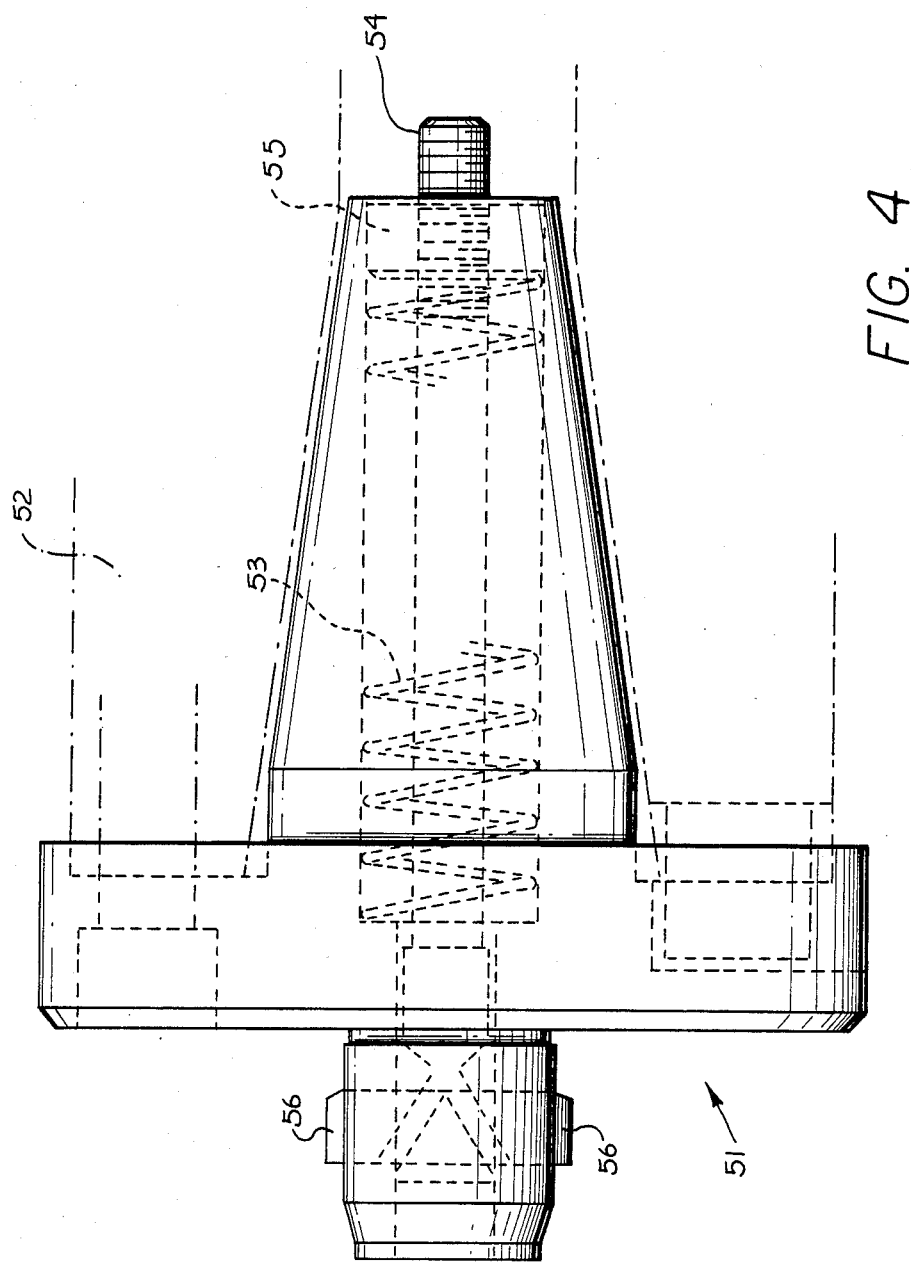

CENTRAL DRAWBAR COUPLING ACTUATING MECHANISM

BACKGROUND OF THE INVENTION

Axial coupling of changeable tools have been developed for flexible tooling systems including automatic tool change for either rotary or stationary tools. In addition to requirements for precision alignment, positive drive, and automatic quick change features, there is a frequent need for high axial force coupling to provide rigidity against separation under substantial cutting radial loads longitudinally displaced from the interengaging coupling surfaces.

A manual system wherein a pair of wedges with tapered actuating surfaces are fed radially by a transverse differential screw is disclosed in U.S. Pat. No. 4,573,824, assigned to the same assignee as the present invention, which references additional prior art. Some quick connect/disconnect coupling arrangements do not offer maximum coupling strength in that they rely on line contact between the two members in transmitting the coupling force.

Certain prior art constructions employ a drawbar extending through the tool head to actuate a knob connected with a tool element such as employed in the "Sandvik Coromant's Manual Block Tool System"; or may actuate angularly disposed dowel pins in a backward radial direction such as employed in the Krupp Widia "Widax-Multi flex tool system"; or may actuate a "Ball Lock" device such as employed in the "Kennametal KV Tooling System".

Such drawbar approaches are generally limited in axial loading force to approximately a 1:1 ratio to drawbar pull.

SUMMARY OF THE INVENTION

An object of the present invention is to provide a central drawbar actuating mechanism with mechanical advantage adapted to apply an axial coupling force which is a substantial multiple of the drawbar axial force and to further enhance the axial load by employing a threaded outbar capable in combination, for example, to convert 115 inch pounds of torque on the drawbar to a 23,000 pound axial force.

In one alternative embodiment, the drawbar is actuated to axially load the tool in the locked configuration by a stack of Bellville spring washers which may develop, for example, 2,000 pounds of axial drawbar force multiplied by the ramp angles in the drawbar and wedges to produce a 10,000 pound axial force coupling between the tool and mounting head. Release of the coupling is effected by hydraulic piston compression of the spring stack producing axial release movement of the drawbar.

Applicant accomplishes these objects through the use of a drawbar having 30° ramp keys engaging matching key-way slots in a pair of laterally displaceable wedge elements which in turn have 20° radially extending ramp surfaces for engaging matching ramp surfaces in the female tool to force it into axial abutment with a drawbar mounting head.

Another object is to supply a central drawbar system adaptable to automatic tool change for either rotary or stationary tools.

The system is applicable to milling, boring, drilling and turning tooling for both stationary and rotating tools and is additionally applicable to produce axial coupling in fixture and pallet clamps.

BRIEF DESCRIPTION OF THE DRAWINGS

FIG. 4 is a spring loaded cartridge style unit for use in a taper socket spindle;

FIG. 5 is a spring loaded driven spindle connection;

DETAILED DESCRIPTION OF PREFERRED EMBODIMENTS

Figure 1:
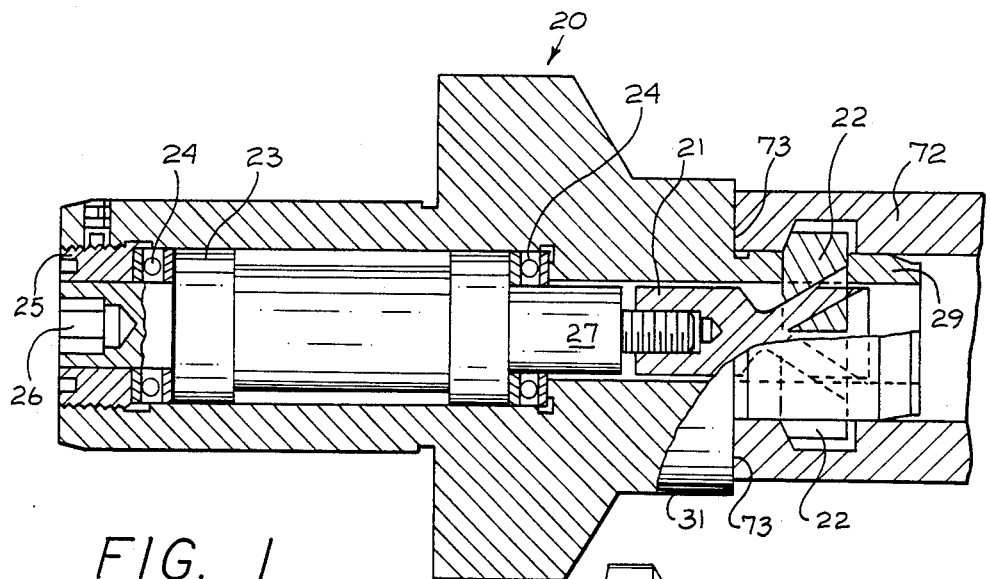
FIG. 1 is a sectional side elevation of a mounting head with drawbar operated connection adapted for turret mounting on an internal tool block.

With reference to FIG. 1, mounting head 20 is equipped with drawbar 21 adapted to actuate a pair of connection wedges 22 in a manner hereafter described in detail to draw a tool shank 72 into abutment at 73. The drawbar shown in locked position is activated by screw 23 preloaded against thrust bearings 24 by bearing preload nut 25 so that manual or automatic engagement of hex socket 26 rotating threaded end 27 will feed drawbar 21 to radially advance or retract wedges 22.

Figure 2:
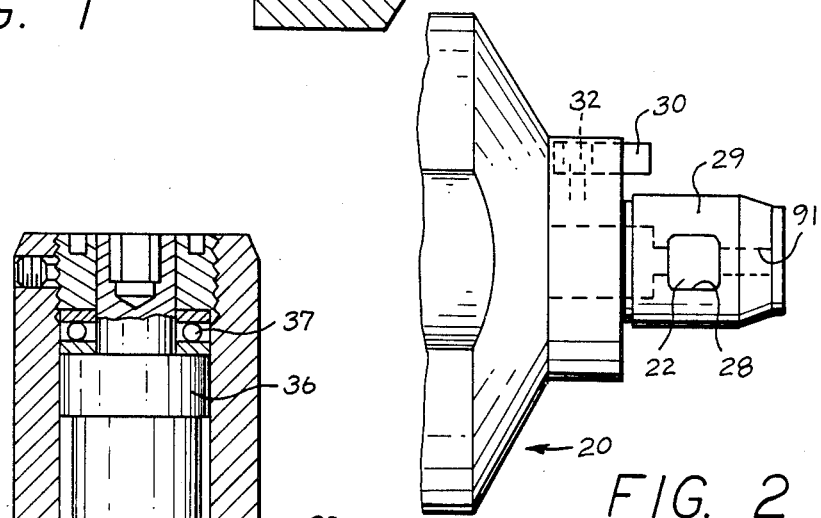
FIG. 2 is a fragmentary plan view of the connection shown in FIG. 1 with the tool element omitted.

As illustrated in FIG. 2, wedges 22 of generally square configuration extend transversely in matching passages 28 of male connection nose 29 with drive key 30 held in head 20 annulus by screw 32.

Figure 3:
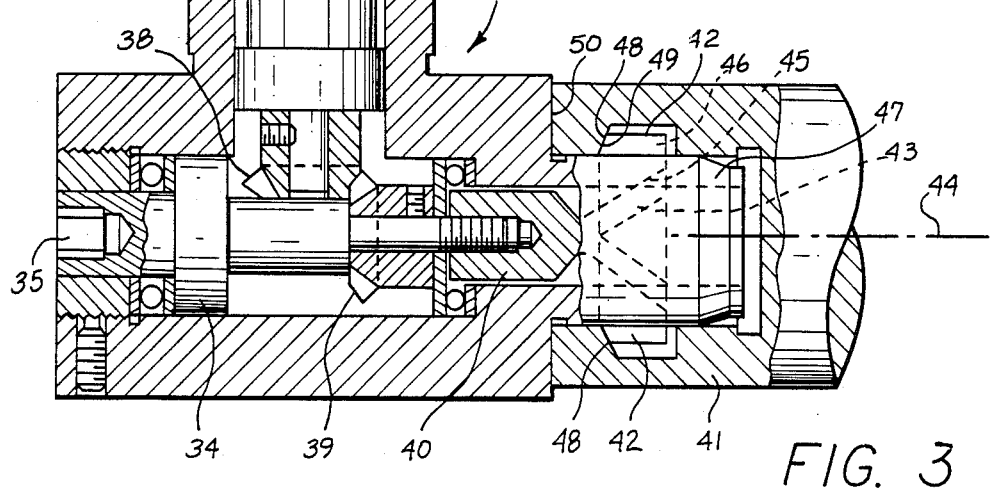
FIG. 3 is a sectional side elevation of a turret mounted connection for external tool block.

With reference to FIG. 3, external tool block 33 is adapted to drive actuating screw 34 directly through socket 35, as in the tool block shank of FIG. 1, or through right angle drive of activating screw 36 having thrust bearing 37 at one end and bevel gear 38 at the other end for driving bevel gear 39 on activating screw 34.

As partially sectioned in FIG. 1, the corresponding FIG. 3 connection of drawbar 40 with tool shank 41 through wedges 42 shows drawbar key 43 extending at a 30° angle to axis 44 engaging matching slot 45 in wedge 42 to force it radially outward through guide passage 46 in pilot nosed male connector 47 forcing 20° ramp surface 48 to engage matching recess surface 49 in tool shank 41 with compressive loading at shoulder surface 50.

With reference to FIG. 4, cartridge style unit 51 for use in taper socket spindle 52 is provided with compression spring 53 loading of drawbar 54 under preload established by nut 55 forcing wedges 56 into radially outward engagement which may be released by hydraulic cylinder or other actuation of drawbar 54 in a releasing direction. A stack of Bellville spring washers is preferably used in lieu of coiled spring 53 to achieve a high range of axial loading in the connection.

With reference to FIG. 5, similar spring loaded actuation of drawbar 57 is provided in a driven spindle mounting, in this case, provided within housing 58 supporting the spindle on radial bearings 59 at either end of spindle shaft 60.

Figures 9, 10:
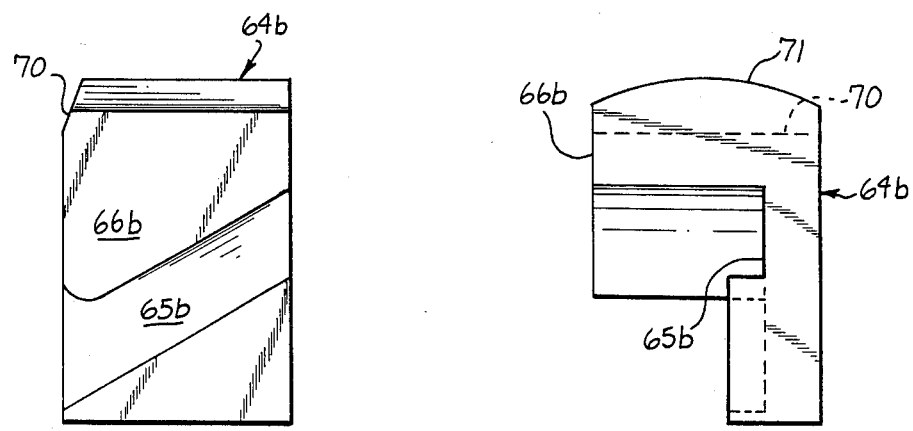
FIG. 9 is a side elevation of one of the wedge elements illustrated in FIG. 6.
FIG. 10 is an end view of the wedge element illustrated in FIG. 9.

With reference to FIGS. 6–10, enlarged views of the drawbar connection per se clearly illustrate the interaction of 30° drawbar keys 61a and 61b projecting from central web 62 extending between longitudinal shoulders 63a opposite key 61a and 63b opposite key 61b. Wedge 64a provided with key slot 65a for engaging key 61a and wedge 64b is provided with slot 65b for engaging key 61b. Wedge main body 66b, which is generally square in cross section as shown in FIGS. 9 and 10, moves into recess 67b in the drawbar when it is advanced to retract the wedges and main body 66a of wedge 64a likewise moves into recess 67a.

While the 30° key/key slot lateral feed of wedges 64a and 64b is offset from the center of the wedges, guide surface 68 of the square transverse passage through male shank connection nose 69 provides for stable feed in area contact for all sliding and reaction surfaces.

Figure 6:
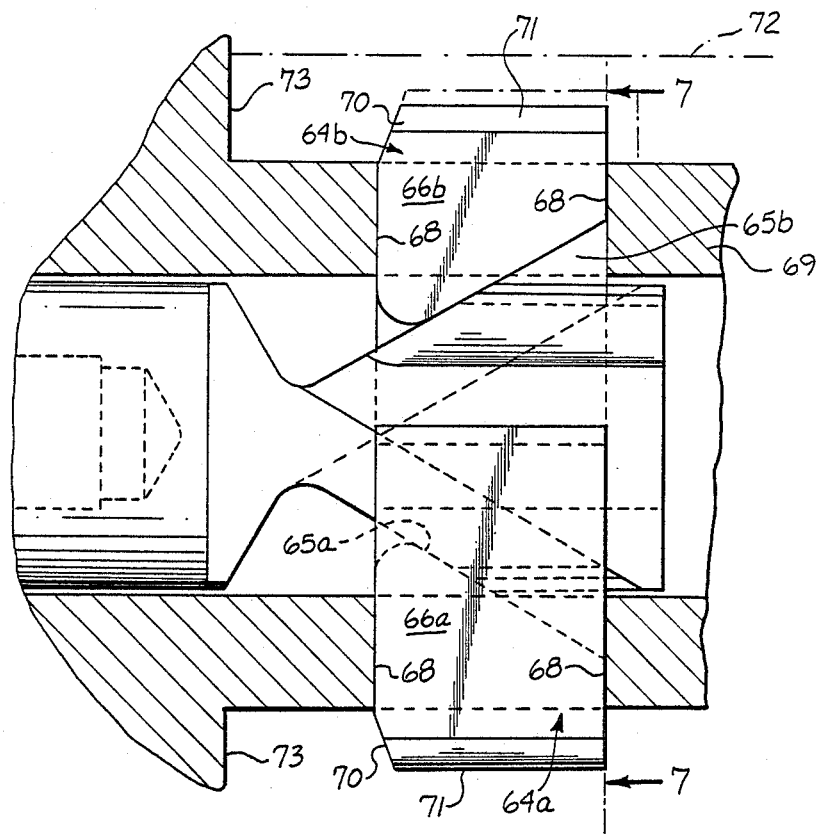
FIG. 6 is an enlarged fragmentary sectional view of a drawbar connection assembly per se employed in each of the tool heads illustrated in FIGS. 1-5.
Figure 7:
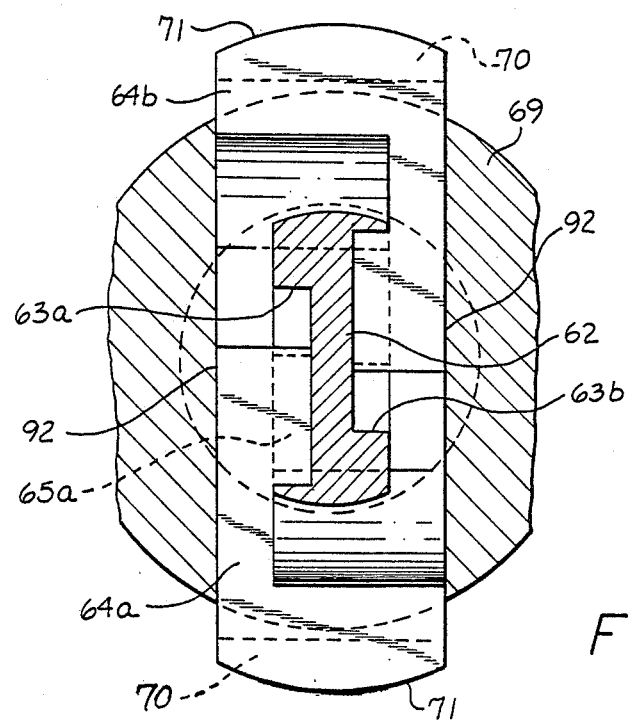
FIG. 7 is an end sectional view taken along the line 7—7 of FIG. 6.
Figure 8:
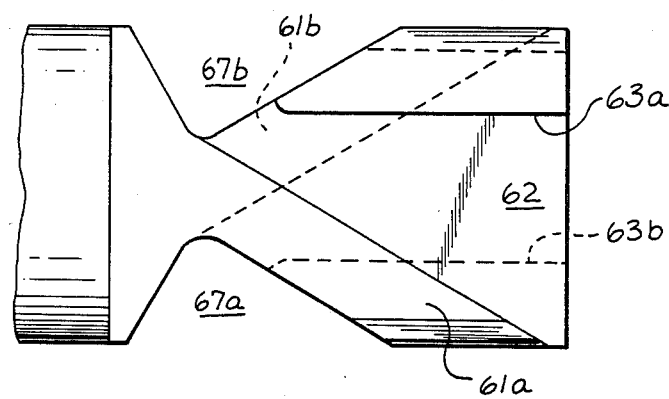
FIG. 8 is a fragmentary side elevation of the drawbar element illustrated in FIG. 6.

The rectangular portion 74, FIG. 7, including flats 31, FIGS. 1, 2 and 6 of the cavity in nose 69 serves to maintain the required alignment of drawbar 75 so that a rotational moment on the drawbar does not create a frictional binding force on the wedges 64a, 64b. Such reduced rectangular cross section of the nose 69 also allows the backing of wedges 64a, 64b by surfaces 76 in nose 69 to prevent the deflection of the inner portion 77 of the wedges and insure the full engagement of the drawbar keys 61a, 61b.

Referring again to FIG. 3, the 20° engaged surfaces 49 of connected tool shank 41 are preferably formed as limited arcs cut by a conical ended mill fed laterally along the centerline path of each wedge so as not to weaken the female connection any more than necessary to seat the wedges. Accordingly, the 20° wedge surfaces 48 in FIG. 3, and corresponding surfaces 70 in FIGS. 6, 7, 9 and 10 are formed as conical segments to provide matching area locking contact. Ends 71 in the wedges are formed with a radius equal to that of nose 69 to provide clearance for passage into connected tool shank 72.

The axial connecting force at shoulder 73 produced by the wedge surfaces 70 results from the combination of direct drawbar axial force generated by threaded end 27, as in the case of the FIG. 1 embodiment, or spring preload as in the case of the FIGS. 4 and 5 embodiments, amplified by the mechanical advantage of the 30° ramp angle and further amplified by the mechanical advantage of the 20° wedge angles. This results, for example, in a 23,000 pound axial load generated by a 115 inch pounds torque on the drawbar screw, or a 10,000 pound axial load in the case of a 2,000 pound spring preload on the drawbar. Such magnitude of axial loading is highly desirable and in many cases necessary in supporting the leverage of radial cutting forces, as in the case of elongated boring bars, in order to prevent separation of the shoulder engagement of the tool shank. Such high axial loading is not feasible with a 1:1 ratio of typical prior art drawbar actuators. It is possible with applicant's axial loading of connected tooling to service 100 horsepower machines, many times the capacity of conventional tool connection systems.

Figure 11:
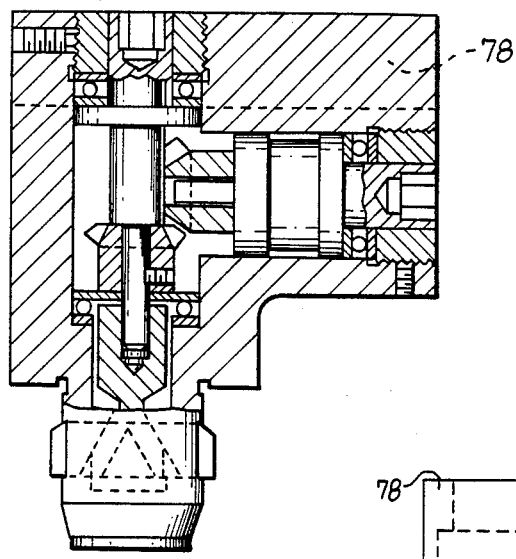
FIG. 11 is a sectional side elevation of a clamp mounting head for die, fixture or pallet clamping.
Figure 12:
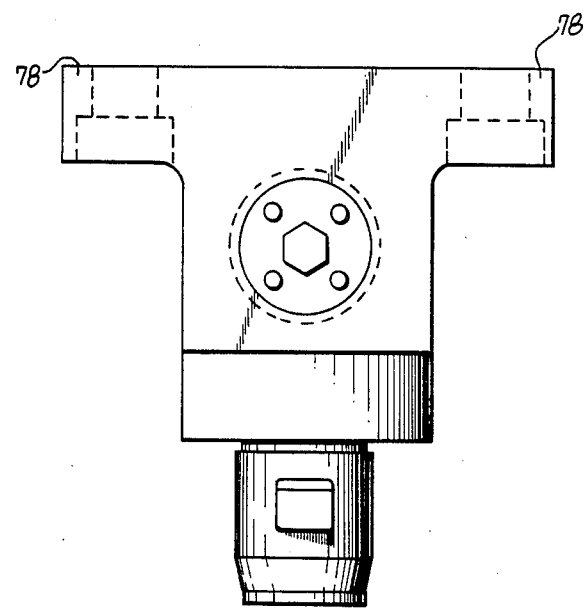
FIG. 12 is an end elevation of the FIG. 11 mounting head.
Figure 13:
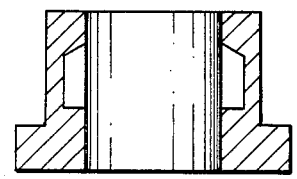
FIGS. 13 and 14 are examples of die, fixture or pallet clamp adapters employing the drawbar connection of FIGS. 11 and 12.
Figure 14:
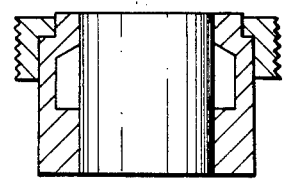

With reference to FIGS. 11–14, in addition to cutting tool applications, highly loaded axial connections can be advantageously employed in die clamps, fixture clamps, or pallet clamps. FIGS. 11 and 12 illustrate a mounting head having right angle alternative drives similar to FIG. 3 with mounting flange projections 78 for station or other actuator attachment. FIG. 13 and 14 adapters are illustrative of typical die, fixture or pallet applications. Highly loaded axial connections are also employed in multiple tool cutter heads, which may be indexed into operative condition.

The foregoing embodiments have all been illustrated with the preferred 30° ramp angle for the drawbar keys to provide the optimum combination of mechanical advantage drawbar stroke and non-binding release; however, it has been found that a 20°–30° range may be employed in practical applications. Likewise, while a 20° wedge angle is preferred, a range of 10°–30° may be employed in operative practical applications.

From the foregoing descriptions it will be understood that the embodiments illustrated are typical applications for rotary tooling which may be employed in combination with extension adapters, shell mill adapters, collet holders for straight shank drills or reamers, helical flute drills, and boring noses as well as the external tool block embodiment of FIG. 3 which may be turret mounted, or otherwise, connecting a variety of mounting noses or threading tools.

I claim:

1. Flexible tooling system for mounting separable tools having respective inter-engaging male and female connection elements, the male element having a shoulder surface axially engaged by the female element, axial loading connection means comprising central axial reciprocable drawbar means extending within said male element, laterally reciprocable wedge ended means engaging transverse reaction passage means in said male element, inter-engaging ramp means between said drawbar and wedge means for positively reversably converting axial reciprocation of said drawbar means to lateral reciprocation of said wedge means, and matching wedge angle recess means within said female element engaged upon lateral outward extension of said wedge ended means to produce axial loading of said shoulder surface as a function of the combination of axial drawbar force, ramp angle, and wedge angle.

2. System of claim 1 wherein said surface comprises a shoulder extending normal to said axial loading.

3. System of claim 1 wherein the angle of said ramp means extends within a range of 20° to 40° relative to the line of said axial reciprocation.

4. System of claim 1 wherein the angle of said ramp means extends at approxiamtely 30° to the line of said axial reciprocation.

5. System of claim 1 wherein the angle of said wedge-ended means extends within a range of 10° to 30° relative to the line of lateral reciprocation.

6. System of claim 1 wherein the angle of said wedge-ended means extends at approximately 20° to the line of lateral reciprocation.

7. System of claim 1 including reversable screw means for producing axial reciprocation of said drawbar means.

8. System of claim 7 including axially fixed thrust bearing means for retaining an axially fixed position of the rotating member of said screw means.

9. System of claim 1 including preloaded spring means for actuating said drawbar means in a direction that drives the wedge-ended means outwardly.

10. System of claim 1 wherein said inter-engaging ramp means includes positive surface drive key and slot means.

11. System of claim 1 including dual wedge means driven oppositely by said inter-engaging means.

12. System of claim 11 including a pair of ramp angle keys on opposite sides of said drawbar, and a matching key slot on each of said dual wedge means.

13. System of claim 11 wherein said dual wedge means engage aligned transverse reaction passages in said male element.

14. System of claim 13 wherein said reaction passages are generally rectangular in cross section.

15. System of claim 1 wherein said matching wedge angle recess means include a concave conical surface engaged by a conical convex wedge end on each of said dual wedge means.

16. System of claim 15 wherein each of said concave conical wedge surfaces is formed by a limited undercut inner wall of said female element.

17. System of claim 1 wherein every loaded contact surface of said ramp means and wedge ended means provides substantial area for load distribution.

18. System of claim 1 wherein said male connection element is provided as an extension of a tapered socket head for use in a tapered socket spindle.

19. System of claim 1 wherein said male connection element is provided as an extension of a driven spindle.

20. System of claim 1 wherein said male connection element is provided as an extension of an internal tool block.

21. System of claim 1 wherein said male connection element is provided as an extension of an external tool block.

22. System of claim 1 wherein said male connection element is provided as an extension of an external tool block including an optional right angle drive means for rotating said screw means.

23. System of claim 1 wherein said female connection element comprises a part of a clamp usable for such purposes as holding a die, fixture or pallet in fixed relation to said male element.

* * * * *